Figure 1:
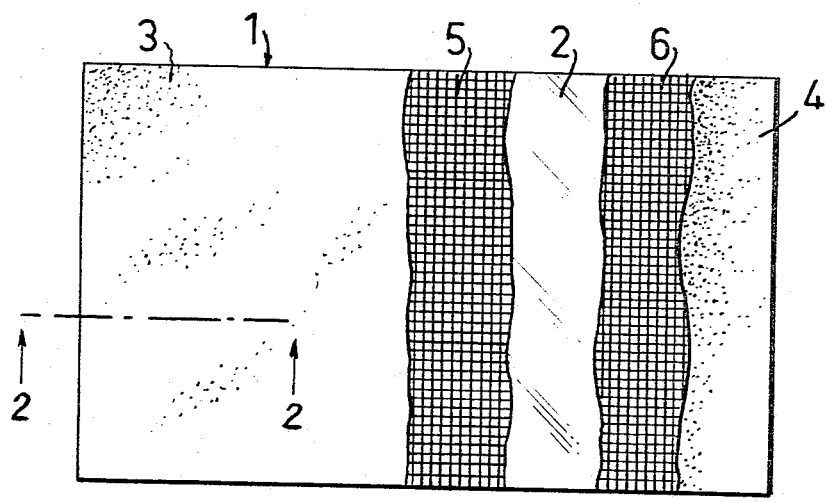

July 11, 1967   H. C. HOOVER   3,330,719
OFFSET PRINTING BLANKETS
Filed Oct. 19, 1965

INVENTOR.
Hugh C. Hoover
BY Erwin A. Yaeger
Attorney

United States Patent Office 3,330,719
Patented July 11, 1967

3,330,719
OFFSET PRINTING BLANKETS
Hugh C. Hoover, 1641 NE. 19th St.,
Fort Lauderdale, Fla. 33305
Filed Oct. 19, 1965, Ser. No. 497,844
1 Claim. (Cl. 161—98)

This invention relates to improvements in transfer elements or so-called "blankets" used in offset printing and in the graphic arts trade in which the element is brought into contact with the surface to be printed. The blanket to be described is particularly useful, because of its construction, for printing on tin plate such as is used in the manufacture of cans, but it can also be used for printing on many other surfaces, such as, for example, paper, plastic, etc.

It is well known in the printing trade that offset blankets will after use begin to show prior printings or imprints on the printed surface. When this occurs the blanket must be discarded from further use, even though there is no damage or deterioration of the blanket itself.

Blankets of the kind presently used generally consist of single sheets of rubber or rubber-like material backed by a backing of fabric, and such sheets exhibit a tendency to become damaged or imprinted in spots, which ruins the entire blanket. The wearing, or imprinting of the blanket may take place only in small areas, resulting in only small punctures or imprints, but, nevertheless, the entire blanket must be discarded. When the blanket is used for printing on tin plate, the blanket is subjected to rough wear and tear and this requires frequent replacement.

It is, therefore, an object of the present invention to provide a blanket for printing purposes which will be provided with rubber on both of its faces, whereby the blanket will be reversible, so that it is possible to reverse the blanket and use it with either of its faces disposed outermost.

It is a further object of the invention to provide a blanket in which the rubber layers will have greater resiliency and compressibility, but at the same time, because of its novel construction, will avoid undesirable stretch or elongation.

It is a still further object of the invention to provide a blanket which will be less subject to puncture or imprinting, which will have materially increased life and which will possess other advantages apparent to those skilled in this art.

More particularly, the invention contemplates the provision of a blanket of this kind which will be composed of a pair of fabric-backed rubber sheets disposed in facial relation and provided with a sheet of imperforate, flexible but non-stretchable metallic sheeting or foil disposed between the backs of the rubber sheets and adhesively united thereto to thereby form a composite sheet having its opposite faces of rubber, said sheets being joined to an inner central layer or lamination of imperforate metallic sheeting.

With these and other objects to be hereinafter set forth in view, I have devised the arrangement of parts to be described and more particularly pointed out in the claims appended hereto.

Figure 2:
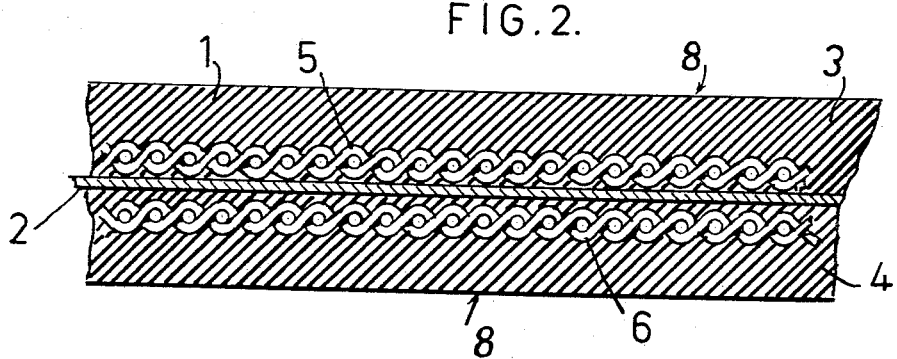

In the accompanying drawing, wherein an illustrative embodiment of the invention is disclosed, FIG. 1 is a face view of a small section of the blanket with parts of the layers thereof broken away to disclose construction, and FIG. 2 is an enlarged sectional view, taken substantially on the line 2—2 of FIG. 1, looking in the direction of the arrows.

Referring to the drawing, 1 indicates generally the body of the improved printing transfer element or blanket, the same being composed of two layers of fabric-reinforced rubber or similar compressible material and provided with a layer or lamination of imperforate sheet metal or foil interposed between them.

The reinforcing layer, indicated at 2 and preferably composed of thin sheet aluminum or foil constitutes a central layer of the blanket, located between two sheets of soft rubber, respectively indicated at 3 and 4. Each of the rubber sheets is backed with or has embedded in it a layer of textile fabric, such as, long stapled Egyptian cotton, such fabrics being respectively shown at 5 and 6. These fabric reinforcements face the central metal sheet 2.

The rubber layers 3 and 4 are preferably of similar, uniform thicknesses and the outwardly presented face 8 of each layer has a smooth, even surface to receive the ink and transfer the same to a sheet of paper, metal or other article having a surface suitable to receive the same.

The several layers or laminae comprising the blanket are adhesively united together so that the finished product forms an integral multi-layered structure presenting a rubber surface on each of its exposed faces.

When one of the rubber faces of the blanket has been used to an extent where it is abraded, worn or deteriorated and will no longer transfer an accurate impression, the blanket is removed from the printing cylinder and reversed and replaced on the cylinder with the new face presented outermost.

I am aware that prior to the present invention, blankets have been made which have incorporated between their rubber layers, a sheet of foraminous material, such as, a sheet of wire netting or mesh. Such mesh was capable of distortion and did not resist stretch to the extent that it is resisted by an imperforate metallic sheet. Moreover, an imperforate sheet of metal serves as a specific unbroken barrier between the rubber sheets and resists the transmission of deficiencies and wear from one of the rubber sheets to the other, resulting in a greatly increased period of useful life for the blanket.

The blanket of the present invention provides a non-stretching transfer sheet which can be positioned on a cylinder without distorting the rubber. It can be economically manufactured; will be economical in use and will possess greater wearing qualities than blankets of ordinary construction.

Having thus described a single embodiment of the invention, it is obvious that the same is not to be restricted thereto, but is broad enough to cover all structures coming within the scope of the annexed claim.

What I claim is:

A blanket for offset printing comprising, two sheets of rubber, each of said sheets having an attached backing of a reinforcing fabric attached to one of its faces, the backings being disposed facially in respect to one another, and a thin, imperforate metallic sheet disposed between the backings, said metallic sheet having its opposite faces adhesively and respectively attached to faces of the backings.

References Cited

UNITED STATES PATENTS

| | | | |
|---|---|---|---|
| 622,889 | 4/1899 | Forsyth | 161—221 |
| 1,211,706 | 1/1917 | Hoerbelt | 161—221 |

ALEXANDER WYMAN, *Primary Examiner.*

JACOB STEINBERG, *Examiner.*

M. A. LITMAN, *Assistant Examiner.*